April 14, 1953 M. W. BEARDSLEY 2,634,590
METHOD AND MEANS FOR COOLING PRODUCE
BY USE OF REDUCED PRESSURE
Filed Feb. 28, 1950 2 SHEETS—SHEET 1
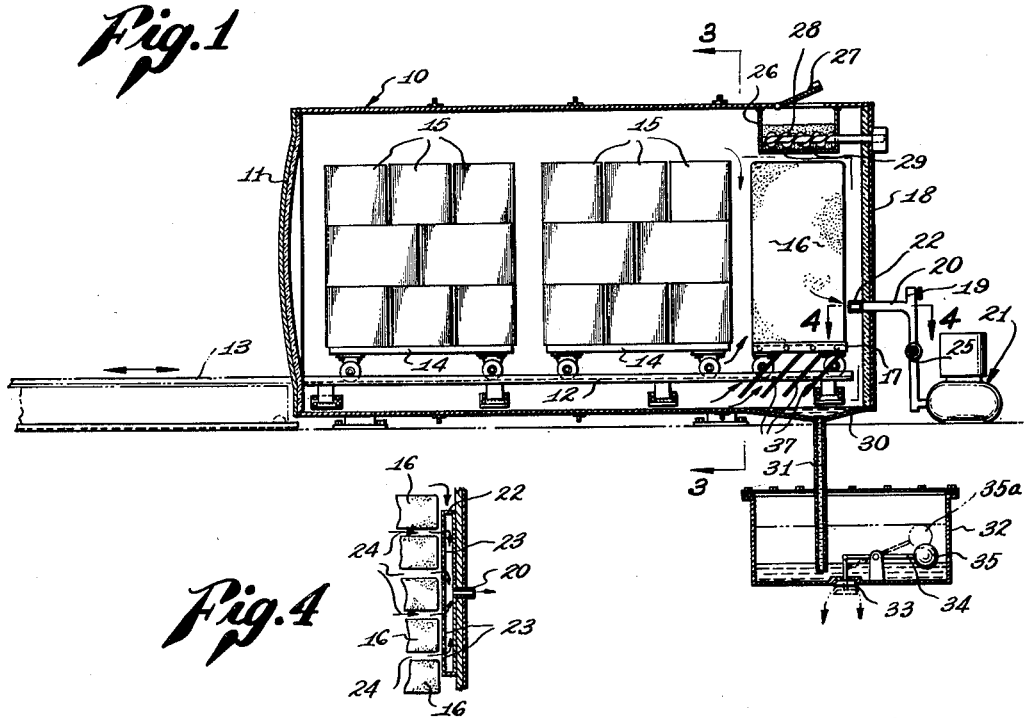
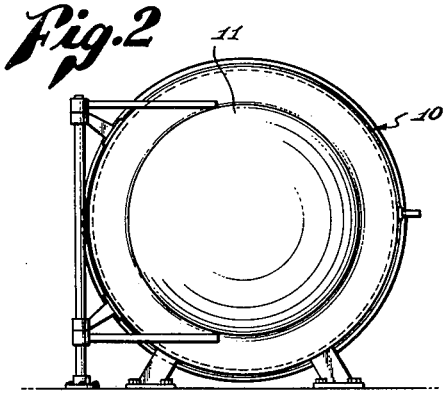
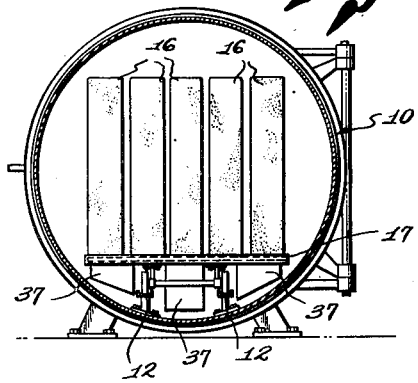
INVENTOR.
MELVILLE W. BEARDSLEY
BY
Fulwider & Mattingly
Attorneys April 14, 1953  M. W. BEARDSLEY  2,634,590
METHOD AND MEANS FOR COOLING PRODUCE
BY USE OF REDUCED PRESSURE
Filed Feb. 28, 1950  2 SHEETS—SHEET 2
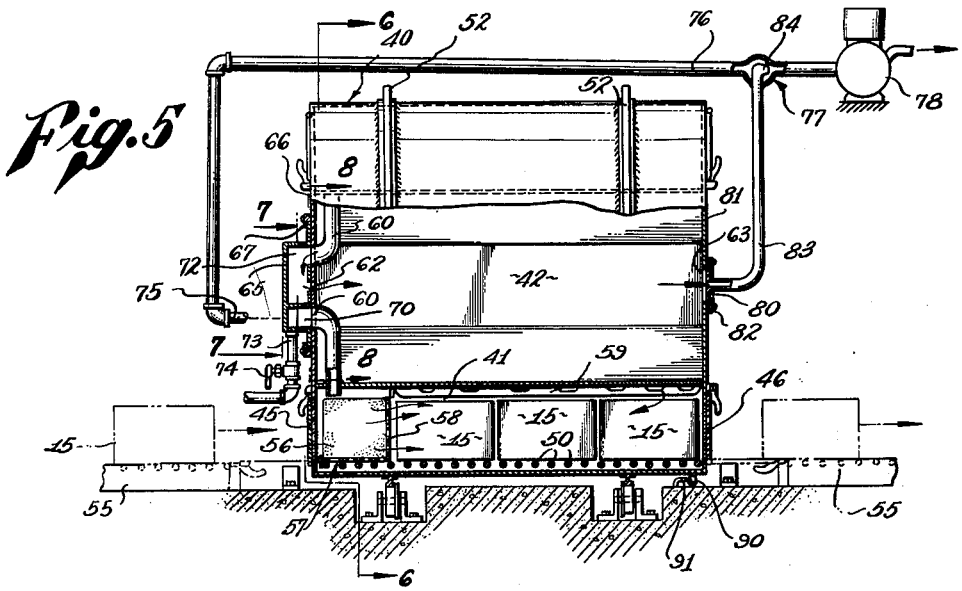
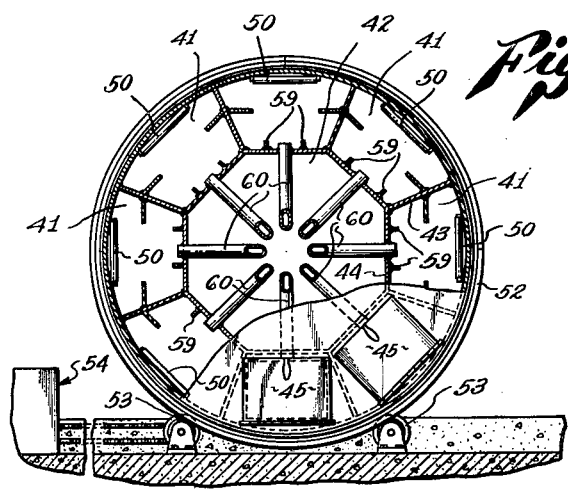
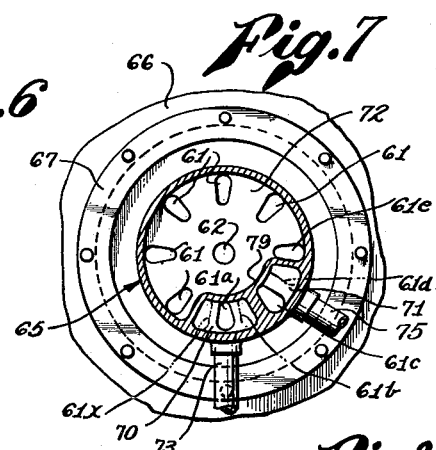
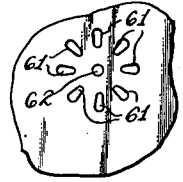
INVENTOR.
MELVILLE W. BEARDSLEY
BY
Fulwider & Mattingly
Attorney Patented Apr. 14, 1953

2,634,590

UNITED STATES PATENT OFFICE 2,634,590

METHOD AND MEANS FOR COOLING PRODUCE BY USE OF REDUCED PRESSURE

Melville W. Beardsley, Venice, Calif.

Application February 28, 1950, Serial No. 146,784

21 Claims. (Cl. 62—168)

My invention relates generally to the cooling and refrigeration of vegetable produce and fruits, and more particularly, to the precooling of such produce as lettuce prior to its shipment. A method and apparatus for this general purpose are disclosed in the co-pending application of Melville W. Beardsley and Rex L. Brunsing, Serial No. 105,302, filed July 18, 1949, and entitled Apparatus and Method for Precooling.

A customary practice in cooling produce such as lettuce prior to and during the shipment thereof is to interlayer the produce with crushed ice while it is being packed into the shipping crates, and to also cover the closed crates with ice in the refrigerator cars in which they are shipped. As stated in the above-identified co-pending application, the disadvantages of the conventional procedure just described are that the crushed ice tends to bruise tender vegetables such as lettuce; the water from the melting, crushed ice causes considerable deterioration of the produce during the shipment thereof and is generally a nuisance; and the crushed ice, in spite of great care in distributing the same, does not maintain as uniform a temperature throughout the body of the packed shipment as is desired. Still further, the operation of packing the crushed ice into crates or other containers with the produce is a costly and time-consuming phase of the shipping procedure.

The above-identified co-pending application discloses a method and means for precooling produce by means of a vacuum, causing evaporation of the surface moisture therefrom, a process described generally as "vacuum cooling." The present invention concerns further improvements in the method and apparatus for vacuum cooling.

In connection with the present invention, it should be noted that the use of vacuum precooling does not entirely dispense with the necessity of ice refrigeration, and that ice is employed in the bunkers of the refrigerator cars in which produce, precooled by the vacuum cooling system, is shipped. Thus, it is necessary to have ice available at or near the shipping point of vacuum precooled produce.

Bearing in mind the general purposes of vacuum precooling, and also the fact that ice will be usually available at shipping points, it is a major object of the present invention to use ice to increase the speed and facility with which produce may be precooled by the vacuum method.

Another object of the invention is to reduce the size and power requirements of the plant used in vacuum precooling produce.

A further object of the invention is to make use of ice in the process of vacuum cooling, without placing such ice in direct contact with the produce being cooled.

Yet another object of the invention is to provide apparatus for ice refrigeration in which it is possible to achieve relatively even distribution of temperature throughout the body of the refrigerated material.

A still further object is to provide apparatus particularly adapted for continuous operation in the precooling of packed produce.

An additional object is to provide apparatus for materially increasing the efficiency of ice refrigeration from the standpoint of the theoretical heat-absorbing capacity of ice.

A still further object is to provide precooling apparatus especially adapted to handle crated produce.

Yet another object is to provide efficient means for removing water from an ice refrigeration chamber without wetting the produce therein.

The foregoing and additional objects and advantages of the invention will be apparent from a consideration of the following detailed description thereof, such consideration being given likewise to the attached drawings, in which:

Figure 1 is an elevational longitudinal section taken through a simple, single chamber precooling refrigerator embodying certain features of the present invention;

Figure 2 is an elevational end view of the apparatus of Figure 1, as seen from the left;

Figure 3 is an elevational section taken on the line 3—3 in Figure 1;

Figure 4 is a horizontal section taken on the line 4—4 in Figure 1;

Figure 5 is an elevational longitudinal section taken through a modified form of vacuum cooling refrigerator embodying the present invention and employing multiple refrigeration chambers;

Figure 6 is an elevational section taken on the line 6—6 in Figure 5;

Figure 7 is a partial elevational section taken on the line 7—7 in Figure 5; and Figure 8 is a fragmentary elevational section taken on the line 8—8 in Figure 5.

Before proceeding with a detailed description of the apparatus embodying the present invention, the principles of operation will be described briefly as follows: The first principle made use of in the present invention is that evaporating moisture absorbs heat of evaporation from surrounding media. Thus, if the surface moisture on, let us say a head of lettuce, is caused to evaporate by reducing the surrounding vapor pressure, the heat of evaporation necessary to cause such evaporation will be absorbed from the head of lettuce, thus cooling the same. This principle is also employed in the apparatus described in the above-identified co-pending application.

The second principle employed in the present invention is that vapor brought into contact with a surface colder than the dew point of such vapor at its then pressure will cause the vapor to condense with the result that a corresponding amount of heat is released by the vapor and adsorbed by the cold surface. Such condensation also, of course, results in a reduction of the pressure if it is accomplished in a closed chamber.

These two principles are employed in the present apparatus by placing produce to be cooled and bodies of ice in the same enclosure and removing the air from such enclosure. It will then be seen that, as the air is removed and the pressure reduced within the enclosure, a point will be reached at which the surface water present on the produce will be boiled off, thus absorbing heat from the produce, and at the same time, such vapor as comes in contact with the ice will condense thereon, causing a melting of the ice due to the released latent heat of vaporization.

Accordingly, when the air has been substantially removed from the enclosure, evacuation thereof may theoretically be stopped and the process of transfer of heat from the produce to the ice will continue until all of the produce reaches ice temperature or until all of the ice has been melted. As will be pointed out in more detail hereinafter, it is important to the operation of such a system that as much as possible of the air be removed from the chamber so as to substantially fill the same with vapor at the time pumping of the air is stopped, otherwise the aforesaid heat transfer operation will terminate short of the desired reduced temperature in the produce, due to the partial vapor pressure of the water vapor, plus that of the remaining air in the chamber being such as to prevent further condensation of the moisture on the ice. If air is allowed to remain in the chamber, it soon collects in a blanket around the ice and prevents or greatly inhibits further condensation. The formation of such a blanket is due to the fact that the condensation at the ice surface removes the water from the air-water vapor mixture, leaving relatively pure air. Thus, I have found it advantageous to continue the pumping during the entire cooling cycle in order to keep the aforesaid blanket of air from forming and to draw the water vapor into contact with the ice.

In the simple form of the device illustrated in Figures 1 through 4, a single chamber is charged with ice and produce; the chamber is substantially evacuated of air; and the heat transfer process is allowed to continue until the desired precooling temperature of the produce has been reached.

An important feature of the present process is that the produce cannot be cooled to a point less than the freezing point of water (i. e., the temperature of the ice in the chamber) and consequently, there is no danger of damaging the produce by freezing the same or portions thereof. In this connection, it will be noted that the amount of heat removed from the produce during the cooling cycle is substantially equal to the heat of fusion required to melt the amount of ice placed in the chamber with the produce. These amounts of heat are not, of course, exactly equal due to the fact that some heat is removed by pumping vapor from the chamber and also the ice itself may be "supercooled," that is, below the freezing temperature of water. However, the latter factors are of secondary importance, the primary cooling effect being due to the melting of the ice. Thus, it will be seen that the process can be controlled with considerable nicety by measuring the charge of ice placed in the chamber at the beginning of the cooling cycle.

I have found by experiment that practically all leafy vegetable produce for which the present process is adapted is very largely water—usually around 90%. Thus, for all intents and purposes, the specific heat of the produce can be considered as 1.0. Accordingly, if the weight of produce to be cooled and its temperature are known, it is possible by putting a predetermined amount of ice into the chamber, to closely control the terminal temperature of the produce at the end of the cooling cycle and also to avoid the waste of ice. While continued pumping after the ice has been consumed will slowly reduce the temperature, this subsequent reduction in temperature is so slow that there is little or no danger of freezing the produce.

Following the aforesaid principles, a simple formula can be derived by which the necessary weight of ice is determined. Letting $W_i$ equal the weight of ice required, $\Delta T$ equal the desired reduction in temperature of the produce in degrees Fahrenheit, and $W_p$ equal the weight of produce, the formula then is:

$$W_i = \frac{\Delta T}{144} \times W_p$$

with the further assumption that no condensate or melted ice is removed from the chamber during the cooling cycle. If provision is made, as will hereinafter be described in detail, to remove the condensate and melted ice, the formula becomes:

$$W_i = \frac{\Delta T(W_p)}{144 + \left(\frac{\Delta T}{2}\right)}$$

In employing the foregoing formulas, I have found it expedient to add about 10% more ice than is indicated by the formula, thus assuring that there will be sufficient surface of condensation during the entire cooling cycle and taking case of heat losses through the walls of the chamber. This results in a small amount of ice being left after the completion of the cycle, but such amount is not sufficient to cause any appreciable waste of ice.

As a further means to accelerate the cooling toward the end of the cycle, I have found that it is sometimes expedient to add salt to the ice, thus increasing the rate of heat absorption due to the melting of the ice.

In the simple form of apparatus just referred to, means are disclosed for removing the water produced by the melting ice during the heat transfer phase of the operation. Such means may also be incorporated in the continuous operation apparatus illustrated in Figures 5 through 8, although in the interests of simplicity, the water removing apparatus has been shown in connection with the simple form only.

Referring now to Figures 1 through 4 for a description of the simple form of apparatus embodying the invention, it will be seen that a cylindrical chamber is identified by the reference character 10, having a hinged circular access door 11 forming one of the ends thereof, and a simple circular bulkhead 19 forming the other end. Within the chamber 10 is mounted a pair of tracks 12 in the form of channels, adapted to receive wheeled trucks 14 on which are loaded crates 15 of produce to be cooled.

Extensions 13 of the tracks 12 are provided outside of the chamber 10 for the purpose of delivering the trucks 14 into the chamber 10. Prior to the introduction of the loaded produce trucks 14, a relatively short truck 17 carrying upright blocks of ice 16 is rolled into the chamber 10 and against the rear wall 18 thereof.

After the ice 16 and the produce 15 have been loaded into the chamber 10, the access door 11 is shut, forming an air-tight enclosure within the chamber 10. Air is then pumped out of the chamber by means of a pump 21 through a suitable conduit 20. The inner end of the conduit 20 is connected to a transverse manifold 22 having a series of spaced openings or suction ports 23, so that the air is withdrawn through channels 24 between blocks of ice 16, as shown in Figure 4. Thus, all of the gas, whether air or water vapor, which is removed from the interior of the chamber 10 must pass in close proximity to the surface of the blocks of ice 16. Accordingly, the water vapor constituent of the moving gas mixture is largely removed by condensation on the ice, thus making it necessary for the pump to move substantially pure air only. This, in turn, makes possible the use of a pump of relatively small cubic foot per minute capacity, as compared to vacuum cooling systems which require the pumping out of all vapors including the evaporated moisture.

When the pressure within the chamber 10 is reduced to a point where it is substantially equal to the vapor pressure of water at the then temperature of the produce 15, pumping may in some cases be stopped and the exhaust conduit 20 closed by means of a valve 25 therein. Thereafter, the heat transfer operation will be automatic, the moisture continuing to evaporate from the produce 15 and condensing on the ice 16. As long as the temperature of the produce 15 is substantially greater than that of the ice 16, the process will continue at a relatively rapid rate, slowing gradually as the temperature of the produce 15 drops to close to that of the ice 16. Even more rapid cooling may be accomplished by continuing to operate the pump 21, thus increasing the rate of evaporation of moisture from the produce 15 and consequent removal of heat therefrom. Also, it is preferable to continue operation of the pump during the entire cycle in order to prevent formation of the above-mentioned air blanket and also to remove $CO_2$ released by the produce and dissolved air released by the melting ice. The result of condensation on and adjacent the ice 16 is, as previously stated, to melt the ice. Condensate and water from the melting ice is collected in a sump 30 formed in the bottom of the chamber 10, from which it is discharged through a vertical discharge pipe 31 into a closed collection tank 32 under the chamber 10, the latter having sufficient capacity to contain all of the water produced by one charge of ice 16, plus the associated condensate.

A discharge valve 33, operated by a float lever 34, is mounted in the bottom of the tank 32. The arrangement of the float lever 34 and the weight of the float 35 is such that when the tank 32 is empty, the weight of the float 35 pulls upwardly on the valve 33, closing the tank 32.

As soon as sufficient water collects in the tank to raise the float 35 to the position shown in phantom line in Figure 1, and identified by the reference character 35a, the lever 34 is urged to tilt in a counterclockwise direction, allowing the valve 33 to open and empty the tank 32. Such operation of the valve 33 will occur only when the pressure inside the tank is substantially atmospheric, however. It will be noted that when the operation of cooling is started in the tank 10, the first result is to reduce the general pressure within the chamber 10 and also, by reason of the connecting pipe within the tank 32. As soon as the pressure in the tank is slightly reduced, the valve 33 is held closed by the relatively greater exterior pressure, thus preventing the air from leaking into the tank 32 and hence into the chamber 10.

As previously stated, it is sometimes desirable to speed up the cooling rate toward the end of the cycle. For this purpose, a salt container 26 is mounted above the ice 16 and is provided with an agitator 28 which may be actuated by suitable automatic means to drop salt through perforations 29 onto the ice 16. This may be done toward the end of the cycle when only a small amount of ice remains to compensate for the relatively reduced cooling surface of ice. An access door 27 is provided for refilling the container 26.

When the produce 15 has been reduced to the desired temperature, substantially all of the ice 16 will have been melted and will be contained in the tank 32 in the form of water. Thereupon air is allowed to re-enter the chamber 10 by means of a valve 19 in the vacuum pump line 20, and as soon as the pressure differential is eliminated by the influx of air, the access door 11 is opened, the cooled produce removed, another charge of ice and additional produce to be cooled is replaced in the chamber, and the foregoing cooling process repeated. As soon as air is allowed to fill the chamber 10, the vacuum in the tank 32 is released, the float 35 rises, opening the valve 33 to discharge the melted ice from the tank 32. The time required to discharge the chamber 10 is sufficient to allow the tank 32 to empty.

It is, of course, desirable that as much heat as possible be removed from the chamber 10 during the cooling operation, and to this end, means are provided for passing the ice-water produced by the melting ice 16, and the vapors emanating from the produce 15 in close heat transfer relationship, prior to the collection of the water in the sump 30. Such heat transfer means comprises a series of angularly disposed, flat plates or baffles 37 secured to the undersurface of the ice truck 17, the baffles 37 serving to catch the melting ice dripping downwardly from the cakes of ice 16, and to additionally direct vapor moving rearwardly from the produce 15 upwardly between the cakes of ice 16. The melting ice 16 is thus caused to run in relatively thin streams down the baffles 37, and is placed in close heat transfer relationship to the vapor moving upwardly between the cakes of ice. Thus, a considerable amount of the vapor emanating from the produce 15 condenses on the baffles 37, mixes with the ice water, and collects in the sump 30. The vapor which condenses on the blocks of ice 16 themselves, of course, also runs downwardly and collects in the sump 30, to eventually be discharged through the operation of the collection tank 32. Also, the removed condensate approaches vapor temperature rather than being near freezing as would otherwise be the case.

One of the essentials of the present apparatus is that the air in the chamber 10 at the start of operation be "purged" from the chamber by the operation of the pump 21, rather than leaving pockets of air in the chamber during the entire operation. As previously stated, any substantial quantity of air remaining in the chamber seriously interferes with the heat transfer operation above described. It will be seen that the arrangement shown in Figure 1 accomplishes the above-described purging action by reason of the fact that the suction ports 23 in the manifold 22 are placed in close proximity to the ice, thus causing all of the gases moving out of the chamber to move over the ice, and also drawing away air tending to form a blanket around the ice.

A further advantage of the arrangement shown in Figure 1 is that the produce is initially warmest at the end of the load furthest from the ice 16. This means that as the pressure within the chamber 10 is reduced, the boiling of surface moisture starts first at the end of the chamber furthest removed from the ice, and the chamber gradually fills with water vapor, starting from the left end (in Figure 1) and filling to the right. Thus, a moving wall of water vapor pushes the air in the chamber 10 out ahead of it.

For a description of a modified form of the present invention, adapted particularly for continuous operation, reference should now be had to Figures 5 through 8. In the continuous operation apparatus, a relatively large cylindrical chamber 40 is divided into eight segmental compartments 41, each of which extends the entire length of the chamber 40. The chamber 40 is further divided to form an octagonal central compartment 42, which also extends the entire length of the chamber 40. All of the segmental compartments 41 and the central chamber 42 are hermetically divided, one from the other, by interior walls 43 and 44.

Each of the segmental compartments 41 is provided with an entrance door 45 and an exit door 46, which doors may be opened to admit and discharge crates of produce 15 which may be pushed into the chamber 41 from the left (in Figure 5) and out at the right through the opening of the door 46. A conveyor section comprising a series of transverse rollers 50 is mounted in each of the chambers 41 to facilitate the movement of the crates of produce 15 through the compartments.

The entire chamber 40 is mounted for rotation, such mounting means including a pair of circumferential rails 52 which are supported on stationary rollers 53 so that the entire unit may be rotated about a central longitudinal axis.

Means for rotating the chamber 40 is provided in the form of a motor drive mechanism 54, including a timer to interrupt the rotation at appropriate intervals as will hereinafter be described.

In general, the operation of the apparatus illustrated in Figure 5 consists in rotating the cylinder 40, pausing each time the lowermost of the segmental compartments 41 is aligned with an exterior conveyor system 55, opening the doors 45 and 46, of the aligned compartment, pushing out the then cooled produce crates in such compartment, replacing such crates with produce to be cooled, and inserting a charge of ice 56 into the compartment at the left end thereof, as illustrated in Figure 5. It will be noted that the doors 45 and 46 fold outwardly to bridge the gaps between the exterior conveyor system 55 and the interior conveyor rollers 50.

The ice 56 may be placed directly on the interior rollers 50 or preferably may be supported on an auxiliary pallet 57, having a perforated upstanding end 58.

In order to prevent the crates from tumbling about in the compartment during the rotation of the chamber 40, a number of longitudinally extending guide rails 59 are secured to the interior walls 43 and 44, and extend into close proximity to the crates so as to keep them substantially in the position shown in Figure 5 during the rotation of the chamber 40.

During the time that any particular compartment 41 makes one complete revolution and returns to its position of alignment with the conveyor system 55, the cooling cycle effected by evacuation of the chamber is completed. Such cycle comprises a number of different stages, during each of which the chamber is connected in a different manner, as will now be described.

Each of the chambers 41 is connected by an interior conduit 60 to one of a number of circumferentially arranged ports 61, formed in the left end 66 of the chamber, as best seen in Figure 8. The interior octagonal compartment 42 is provided with an inlet port 62, located at the left end of the chamber 40 and in the center of the circumferentially arranged ports 61, and an exhaust port 63 located at the right-hand end of the chamber 40. The ports 62 and 63 are coaxial with the chamber 40.

A non-rotating hat-shaped manifold 65 is coaxially supported against the left end of the chamber 40, the adjacent surfaces of the manifold 65 and the chamber end 66 being machined to a relatively close fit, whereby to form a substantially fluid-tight sliding joint. A ring-shaped member 67, attached by suitable bolts to the chamber end 66 and overlapping the flange of the manifold 65, holds the chamber end 66 and the manifold 65 in relatively rotatable, fluid-tight relationship. The manifold 65 is held against rotation by a fluid conduit connected thereto, as will be hereinafter described.

As can be seen best in Figure 7, the interior of the manifold 65 is divided into three chambers, each adapted to overlie a certain number of the circumferentially arranged ports 61. These three chambers are identified by the reference characters 70, 71 and 72, and represent the first, second and third stages, respectively, of the pumping operations. The interior width of the manifold chambers 70—71—72 is such that the first stage 70 is sufficient to just overlie two adjacent ports 61; the width of the second stage chamber 71 is such as to overlie one only of the ports 61 but to permit motion of such port within the chamber space through an angular distance equal to $\tfrac{1}{16}$ of the revolution of the chamber 40; and the circumferential width of the third stage chamber 72 is such as to overlie a maximum of six of the eight ports 61. It will be noted that in some positions only five of the ports 61 are connected with the manifold chamber 72.

The first stage manifold chamber 70 is provided with a fluid connection 73, having a valve 74 by which it may be selectively communicated with atmosphere; the second stage chamber 71 is provided with a fluid connection 75 connected by a conduit 76 through an ejector pump 77 to a vacuum pump 78.

By reason of the shape of the interior wall 79 which divides the manifold 65 into the chambers 70—71—72, all of the ports 61 which underlie the third stage manifold chamber 72 are placed in communication with the central port 62 and hence with the interior compartment 42.

A stationary flanged fluid connection 80 at the right-hand end of the chamber 40 is rotatably secured to the end wall 81 of the chamber 40 by means of a flanged hold-down ring 82, so as to hold the flanged connection 80 in relatively rotatable fluid-tight connection with the port 63. Air and vapor is withdrawn from the interior compartment 42 through a conduit 83 connected to the fluid connection 80, and is discharged into a central nozzle 84 of the ejector pump 77.

The effect of the ejector pump 77 is to cause a relatively high degree of vacuum in the interior compartment 42 as compared with the degree of vacuum effected in the first stage manifold chamber 71 due to the direct connection through the conduit 76. This is due to the fact that the rate of air and vapor discharge from the compartment 41 is relatively high during the initial stages of decompression and thus the vapors flowing around the nozzle 77 operate according to the well-known Venturi principle to cause a further decompression of the interior chamber 42.

The following is a description of the operation of one cooling cycle of the apparatus illustrated in Figure 5, considering the travel of one particular port 61. The initial port position of any chamber 41 at the time it is in position to be loaded, as shown in Figure 5, is represented by the reference character 61a in Figure 7. The arrangement of the drive and timer mechanism 54 is such that the rotation of the chamber 40 is counter-clockwise (Figure 6) and is interrupted every 1/16 of a revolution. Thus, the first stop made by the port under consideration is 1/16 revolution to the right of the initial position 61a. This first stop position is indicated by the reference character 61b. Successive positions are indicated by the characters 61c, 61d, etc.

It will be noted that at the first stop position 61b, the port now under consideration still underlies the first stage manifold chamber 70. At the same time, the port 61 immediately to the left of the port under consideration is brought into a position 61x, wherein it also underlies the first stage chamber 70. Due to the fact that both of these ports (at 61b and 61x) underlie the same chamber 70, they are intercommunicated and therefore the air at atmospheric pressure (due to the chamber having just been loaded) in the chamber connected to the port 61b rushes into the compartment connected to the port 61x, which due to having just completed a cooling cycle is at minimum pressure. The two ports 61b and 61x remain stationary in the position indicated in Figure 7 for a brief period during which the pressure in the two compartments is equalized, at approximately 15 inches of mercury. As soon as the pressure is equalized in this manner, another 1/16 revolution takes place, carrying the port under consideration into the position 61c wherein it now underlies the second stage chamber 71. When in this position, it is subjected to the high flow decompression effect of the air and vapor being withdrawn through the conduit 76 by the vacuum pump 78 and the pressure in the chamber 41 is further reduced.

The same 1/16 revolution which carried the port under consideration into the position 61c also carried the port at position 61x into the center of the first stage manifold chamber 70. At this time, air at atmospheric pressure is admitted into the chamber 41 connected to the port 61x by opening the valve 74 connected to the first stage manifold chamber 70. When the pressure in this chamber 41 reaches atmospheric, due to this influx of air, the doors 45 and 46 may be opened, the cooled material in the chamber 41 removed, new crates of produce 15 and ice 56 inserted in the chamber, and the doors again closed. Then the chamber is again moved 1/16 of a revolution carrying the newly loaded chamber port to the position 61b and the previously discussed port to the position 61d, where it still underlies the second stage manifold chamber 71.

The next successive 1/16 revolution carries the first-mentioned port to the position 61e where it is brought into communication with the central port 62 and hence the relatively high vacuum in the interior compartment 42. The next five successive stops of the port are all under the third stage manifold chamber 72, thus to complete the evacuation of the compartment 41 and the cooling of the produce therein.

During the cooling cycle, the ice 54 is, as in the previously described method, substantially consumed or converted into water. Such water collects in a thin pool against the side of the compartment 41 and of course flows around the wall as the entire chamber 40 is revolved through one complete revolution. The entire chamber 40 is tilted downwardly to the right slightly so that at each loading stage in the cycle a drain valve 90 at the right-hand end of the compartment may be opened to drain the water from the compartment 41 then being reloaded with produce and ice. The operation of the valve 90 (one being provided for each of the chambers 41) is automatic, being actuated by a stationary stop 91 positioned at an appropriate point under the chamber 40. Similar automatic actuating means and controls can be provided for the air-induction valve 74. Such means being known in the art, no further description thereof is deemed necessary herein.

It will be noted that the rails 59 which guide the crates of produce 15 also serve to hold the same away from the interior walls of the compartment 41, and thus prevent the wetting of the produce due to the melted ice water, which flows around the walls during the cooling cycle. It will be noted that the conduits 60 which intercommunicate the compartments 41 with the ports 61 project slightly through the walls 44 whereby to prevent water from flowing through the conduit 60 during the time that the compartment 41 is in an inverted position.

The foregoing operation is continuous and the pump 78 remains running at all times. In this connection, it should be noted that the interior compartment 42 acts somewhat in the nature of a vacuum reservoir to maintain a substantially uniform load on the pump in spite of the variations caused by loading and unloading the chambers. Also the efficiency of operation is enhanced by the fact that the potential energy represented by the fully evacuated chambers is at least partially used by the first stage operation in which the just-loaded chamber is intercommunicated with the about-to-be-unloaded chamber.

While the cooling method and apparatus shown and described herein is fully capable of achieving the objects and providing the advantages hereinbefore stated, it will be realized that such method and apparatus are capable of some modification without departing from the spirit of the invention. For this reason, I do not mean to be limited to the forms shown and described, but rather to the scope of the appended claims.

I claim:

1. A method of reducing to a predetermined temperature, material having surface moisture thereon, which method comprises the steps of: placing a first portion of said material and a body having a predetermined temperature together but out of physical contact in a first air-tight enclosure; removing substantially all air from said enclosure whereby to leave the same substantially filled with vapor produced by evaporation from said material and to permit condensation of said vapor on said body; leaving said material portion and body in said enclosure for a period of time to effect transfer of heat from said material portion to said body by said evaporation from said material portion and condensation on said body; placing a second portion of said material and a second body having predetermined temperature in a second air-tight enclosure; intercommunicating said first and second enclosures to permit air from said second enclosure to flow into said first enclosure whereby to reduce the pressure in said second enclosure and cause rapid evaporation of said moisture from said second material portion; removing substantially all the remaining air from said second enclosure whereby to leave the same substantially filled with vapor produced by said evaporation and permit condensation of vapor on said second body; and leaving said second material portion and second body in said second enclosure for a period of time to effect transfer of heat from said second material portion to said second body by evaporation from said second material portion and condensation on said second body.

2. A method of reducing to a desired temperature, $T_f$ degrees Fahrenheit, a body of leafy vegetable produce having an initial temperature, $T_i$ degrees Fahrenheit, a weight, $W_p$ in pounds, and having surface moisture thereon, which method comprises the steps of: placing said body of produce in an air-tight enclosure; placing a charge of ice in said enclosure together with, but out of contact with said produce, said charge having a weight equal to between $W_1$ and 1.1 $W_1$ pounds, where $W_1$ equals $$\frac{T_i-T_f}{144}\times W_p$$

removing substantially all air from said enclosure to reduce the pressure therein and cause rapid evaporation of said moisture from said produce, whereby to leave said enclosure substantially filled with vapor produced by said evaporation and to permit condensation of said vapor on said ice; and leaving said produce and ice in said enclosure until said ice is substantially entirely melted.

3. A method of reducing to a desired temperature, $T_f$ degrees Fahrenheit, a body of leafy vegetable produce having an initial temperature, $T_i$ degrees Fahrenheit, a weight, $W_p$ in pounds, and having surface moisture thereon, which method comprises the steps of: placing said body of produce in an air-tight enclosure; placing a charge of ice in said enclosure together with, but out of contact with said produce, said charge having a weight equal to between $W_1$ and 1.1 $W_1$ pounds, where $W_1$ equals $$\left[\frac{T_i-T_f}{144+\left(\frac{T_i-T_f}{2}\right)}\right]\times W_p$$

removing substantially all air from said enclosure to reduce the pressure therein and cause rapid evaporation of said moisture from said produce, whereby to leave said enclosure substantially filled with vapor produced by said evaporation and to permit condensation of said vapor on said ice; placing liquid condensate and water from said ice in heat transfer relation with vapor from said produce to raise the temperature of said condensate; thereafter removing said condensate and ice water from said enclosure; and leaving said produce and ice in said enclosure until said ice is substantially entirely melted.

4. In apparatus for vacuum cooling produce: an air-tight chamber having an access door to admit produce for cooling therein; means to support a cold body in said chamber together with said produce therein; a pump connected by a passage to withdraw fluid from said chamber; and a manifold extending into said chamber and connected to said passage, said manifold having a plurality of suction ports in close proximity to said body-supporting means whereby to constrain the flow of fluid from said chamber to a path past a body supported on said supporting means.

5. In apparatus for vacuum cooling produce: an air-tight chamber having an access door to admit produce for cooling therein; means to support a cold body in said chamber together with said produce therein; a pump connected by a passage to withdraw fluid from said chamber; exhaust port means in said chamber interposed in said passage adjacent said body-supporting means whereby to constrain the flow of fluid from said chamber to a path past a body supported on said supporting means; and baffle means secured in said chamber adjacent said body-supporting means to direct the flow of vapor in said chamber past said body.

6. In apparatus for vacuum cooling produce: an air-tight chamber having an access door to admit produce for cooling therein; means to support a cold body in said chamber together with said produce therein; a pump connected by a passage to withdraw fluid from said chamber; exhaust port means in said chamber interposed in said passage adjacent said body-supporting means whereby to constrain the flow of fluid from said chamber to a path past a body supported on said supporting means; and means including a discharge conduit in said chamber and pressure responsive valve means for said conduit to effect controlled removal of liquid condensate from said chamber.

7. In apparatus for vacuum cooling produce: an air-tight chamber having an access door to admit produce for cooling therein; means to support a cold body in said chamber together with said produce therein; a pump connected by a passage to withdraw fluid from said chamber; exhaust port means in said chamber interposed in said passage adjacent said body-supporting means whereby to constrain the flow of fluid from said chamber to a path past a body supported on said supporting means; and baffle means secured in said chamber beneath said body-supporting means and disposed to catch condensate dripping from said body and place the same in heat exchange relation with vapor emanating from said produce.

8. In apparatus for vacuum cooling produce: an elongated air-tight chamber having an exhaust conduit connected thereto and a sealable access door at one end; a vacuum pump connected to said conduit to withdraw air and vapor from said chamber; tracks in said chamber to receive trucks loaded with ice or produce entering said access door; and an exhaust manifold in said chamber connected to said conduit and having a plurality of spaced exhaust openings positioned above said tracks and adjacent a section thereof whereby to constrain the flow of vapor exhausted from said chamber to movement past a body of ice supported on a truck at said exhaust section of said track.

9. The construction of claim 8 further characterized by having a salt container mounted in said chamber above said exhaust section of said track and operable dispensing means in said container to drop salt on said ice whereby to increase the heat absorption rate thereof.

10. In apparatus for vacuum cooling produce: an elongated air-tight chamber having a sealable access door at one end, and an exhaust conduit; a vacuum pump connected to said conduit to withdraw air and vapor from said chamber; tracks in said chamber to receive trucks loaded with ice or produce entering said access door; a movable ice truck supported on said tracks, said truck having baffles secured thereto and positioned and adapted to catch condensate dripping from ice on said ice truck, to direct vapors toward said ice, and to place said vapors and condensate in heat exchange relation; and an exhaust manifold in said chamber connected to said conduit and having a plurality of spaced exhaust openings positioned above said tracks and adjacent a section thereof whereby to constrain the flow of vapor exhausted from said chamber to movement past a body of ice supported on a truck at the exhaust section of said track.

11. In apparatus for vacuum cooling produce: an elongated air-tight chamber having a sealable access door at an outer end, and an exhaust conduit; a vacuum pump connected to said conduit to withdraw air and vapor from said chamber; tracks in said chamber to receive trucks loaded with ice or produce entering said access door; an exhaust manifold in said chamber connected to said conduit and having a plurality of spaced exhaust openings positioned above said tracks and adjacent an inner end thereof whereby to constrain the flow of vapor exhausted from said chamber to movement past a body of ice supported on a truck at the inner end of said track; and means to collect and remove from said chamber, condensate formed on said ice, said collecting means including liquid discharge conduit connected in the bottom of said chamber, a collecting tank below said chamber and connected to said conduit, said tank having a discharge opening, and check valve means in said discharge opening disposed to prevent flow into said tank when the pressure therein is depressed below atmospheric, and float means in said tank connected to hold said valve open when there is liquid in said tank and said pressure therein is equal to atmospheric.

12. In apparatus for vacuum cooling produce: an air-tight chamber having an access door to admit produce for cooling therein; means to support a cold body in said chamber together with said produce therein; a pump connected by a passage to withdraw fluid from said chamber; exhaust port means in said chamber interposed in said passage adjacent said body-supporting means whereby to constrain the flow of fluid from said chamber to a path past a body supported on said supporting means; and means to collect and remove from said chamber, condensate formed on said cold body, said collecting means including liquid discharge conduit connected in the bottom of said chamber, a collecting tank below said chamber and connected to said conduit, said tank having a discharge opening, and check valve means in said discharge opening disposed to prevent flow into said tank when the pressure therein is depressed below atmospheric, and float means in said tank connected to hold said valve open when there is liquid in said tank and said pressure therein is equal to atmospheric.

13. In apparatus for vacuum cooling produce: a chamber having a plurality of separate air-tight compartments therein arranged about a central axis, each compartment having a sealable access door; means mounting said chamber for rotation about said axis to place said doors successively in a loading station; a vacuum pump; a multiple port valve operatively connected between said pump and compartments, and having an induction port connectable to atmosphere; and means operatively interconnecting said valve and chamber for operation of said valve by rotation of said chamber to place any compartment in said loading station in communication with said induction port, and to place others of said compartments in communication with said pump.

14. In apparatus for vacuum cooling produce: a chamber having a plurality of separate air-tight compartments therein arranged about a central axis, each compartment having a sealable access door; means mounting said chamber for rotation about said axis to place said compartments successively in a loading station; a vacuum pump; a multiple port valve operatively connected between said pump and compartments; and means operatively interconnecting said valve and chamber for operation of said valve by rotation of said chamber to place compartments not in said loading station in communication with said pump and to place the compartment about to enter said loading station in communication with the compartment which has just left said loading station.

15. In apparatus for vacuum cooling produce: a chamber having a plurality of separate air-tight elongated compartments therein arranged about a central axis, each compartment having a sealable access door; means mounting said chamber for rotation about an axis to place said compartments successively in a loading station; means in each compartment adjacent an end thereof to support a body of ice; an exhaust port in each compartment adjacent said ice support and adapted to withdraw air and vapor from said compartment past ice on said support; and means including a multiple port valve to connect said compartments successively to different sources of vacuum to progressively exhaust the same through said exhaust ports.

16. In apparatus for vacuum cooling produce: an enclosure having a plurality of separate compartments therein arranged about a central axis, each compartment having a sealable access door; means mounting said enclosure for rotation about said axis to place said compartments successively in a loading station; a vacuum pump; an ejector pump having a throat connected to said vacuum pump and a nozzle discharging into said throat;

a series of circumferentially arranged exhaust ports in said enclosure, one connected to each of said compartments; and a stationary manifold positioned in relatively rotatable sealing fluid transfer relation with said ports, said manifold having a plurality of chambers overlying said ports and arranged to successively align and communicate with said ports by rotation of said enclosure, a first of said manifold chambers being selectively communicable with atmosphere and positioned to align with the exhaust port of a chamber then in said loading station and also to intercommunicate the port of the compartment about to enter said station with the port of the compartment just leaving said station, a second of said manifold chambers being communicated with the throat of said ejector pump and positioned to align with the port leaving said first manifold chamber whereby to evacuate said compartments at a relatively high initial rate, and a third manifold chamber communicated with said nozzle and positioned to align with the port leaving said second manifold chamber whereby to subject said compartments to relatively high vacuum after said initial evacuation.

17. A method of reducing to a predetermined temperature, material having surface moisture thereon, which method comprises the steps of: moving a series of sealable air-tight compartments intermittently into and out of a loading station, pausing each time a compartment is at said loading station; loading each of said compartments with said produce and ice at said station; sealing and exhausting said compartments not at said station; and intercommunicating the compartment about to enter said station with the compartment that has just left said station.

18. A method of reducing to a predetermined temperature, material having surface moisture thereon, which method comprises the steps of: opening a series of sealable, air-tight chamber compartments one at a time in a predetermined sequence; loading the open compartment with said material and ice; closing the loaded compartment before opening the next in said sequence; sealing and exhausting the loaded and closed compartments; and intercommunicating the compartment about to be opened with the compartment just loaded and closed.

19. Apparatus for cooling vegetable produce having surface moisture thereon to substantially zero degrees centigrade without freezing said produce, comprising in combination: chamber means including a plurality of separate air-tight compartments, each having a sealable access door; conveyor means to deliver said produce selectively into any one of said compartments through said access door thereof; sequencing means to place said conveyor means successively in operative alignment with said doors; means in each compartment to support an exposed body of ice; an exhaust port in each compartment; and means including a multiple port valve operatively associated with said sequencing means to connect said compartment successively to different sources of vacuum to progressively exhaust the same through said exhaust port.

20. A method of cooling vegetable produce to substantially zero degrees centigrade without freezing said produce, which method comprises the steps of: placing said produce and an exposed body of water-ice together but out of physical contact in an air-tight enclosure; reducing the pressure in said enclosure to below the then vapor pressure of surface moisture on said produce whereby to cause boiling of said surface moisture from said produce; creating a vapor current in said enclosure to carry vapor produced by said boiling moisture into heat transfer contact with said ice whereby to condense said vapor, melt said ice, and mix the condensate and melted ice so formed; collecting said condensate-melted ice mixture and passing the same in heat transfer relation with said vapor current at a point therein upstream from said contact with said ice; and thereafter draining said mixture into a sump out of heat transfer contact with said vapor current.

21. A method of cooling vegetable produce to substantially zero degrees centigrade without freezing said produce, which method comprises the steps of: placing said produce and an exposed body of water-ice together but out of physical contact in an air-tight enclosure; reducing the pressure in said enclosure to below the then vapor pressure of surface moisture on said produce, whereby to cause boiling of said surface moisture from said produce; creating a vapor current in said enclosure to carry vapor produced by said boiling moisture into heat transfer contact with said ice whereby to condense said vapor and melt said ice; collecting said melted ice and passing the same in heat transfer relation with said vapor current at a point upstream from said contact with said ice; and thereafter draining said melted ice into a sump out of heat transfer contact with said vapor currents.

MELVILLE W. BEARDSLEY.

References Cited in the file of this patent

UNITED STATES PATENTS

| Number | Name | Date |
|---|---|---|
| 222,122 | Bate | Dec. 2, 1879 |
| 1,062,184 | Palen | May 20, 1913 |
| 1,295,417 | Boerner | Feb. 25, 1919 |
| 1,608,874 | Yumura | Nov. 30, 1926 |
| 1,744,890 | Hanrahan | Jan. 28, 1930 |
| 1,756,992 | Quiggle | May 6, 1930 |
| 2,304,192 | Newton | Dec. 8, 1942 |
| 2,345,204 | Lodwig | Mar. 28, 1944 |
| 2,402,401 | Hickman | June 18, 1946 |
| 2,488,839 | Walter | Nov. 22, 1949 |